Oct. 27, 1964    M. J. GUSTAFSON, JR    3,154,311
SEALING MEANS
Filed Oct. 3, 1961
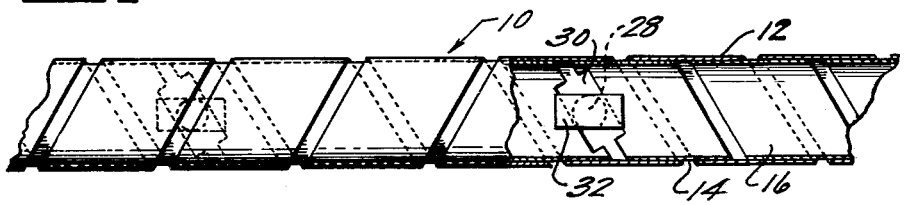
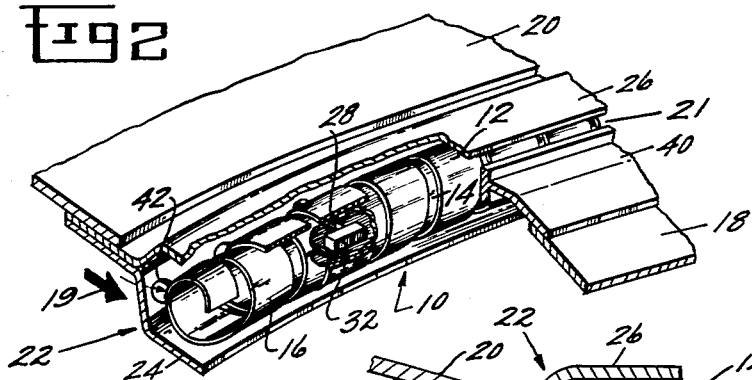
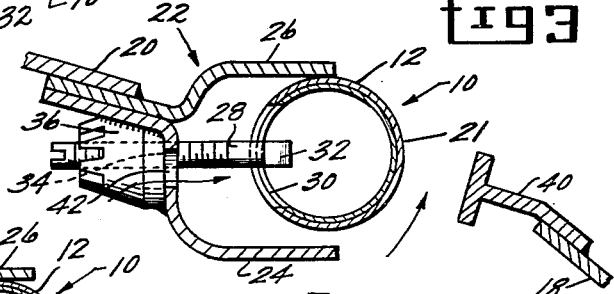
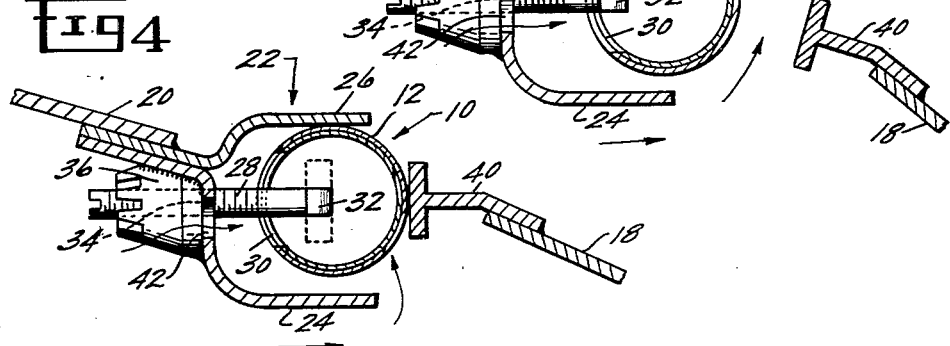
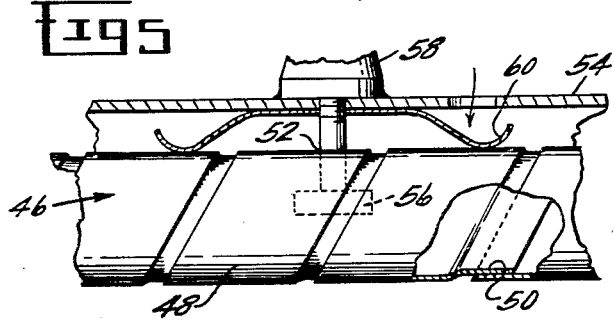
INVENTOR.
MILTON J. GUSTAFSON, JR.
BY
ATTORNEY

United States Patent Office 3,154,311
Patented Oct. 27, 1964

3,154,311
SEALING MEANS
Milton John Gustafson, Jr., Wakefield, Mass., assignor to General Electric Company, a corporation of New York
Filed Oct. 3, 1961, Ser. No. 142,671
2 Claims. (Cl. 277—166)

The present invention relates to sealing means, and more particularly to sealing means for irregular or unfinished joints.

In many applications, it is desired to seal joints that from accuracy standards may be classed as rough joints. Also, it is desired to seal joints where extreme temperatures, either hot or cold, are encountered which render the usual sealing means utilizing organic materials unsatisfactory. For example, joints between sheet metal parts on jet engines may present irregular surfaces because of their length or because of the flexing of the sheet metal that must be effectively sealed to prevent free flow of gases therethrough. These joints in question may be of any shape or form from linear to circular and at the same time may be subjected to extreme temperatures causing expansion or contraction of the parts being joined thereby further complicating the sealing problem.

It is therefore a primary object of this invention to provide improved sealing means adaptable to a wide variety of difficult sealing applications.

Another object of this invention is to provide a seal that is especially adaptable to sealing joints that may present irregular surfaces.

Another object is to provide a seal that is lightweight and unaffected by vibration or high temperatures.

Another object is to provide a seal that affords ease of assembly and replaceability, and also affords simplicity of structure and economy of manufacture.

Briefly stated, in accordance with one aspect of my invention, there is provided a tubular sealing member made by forming resilient strip material into a helical configuration with the edges of the helix overlapped to provide a continuous cylindrical seal member. Such sealing member is housed or supported adjacent to the members forming the joint in a manner such that it is forced tightly against the members by fluid pressure or spring loading to effectively seal the joint.

My invention will be better understood from the following description taken in connection with the accompanying drawing and its scope will be pointed out in the appended claims.

In the drawing,

FIGURE 1 is a partial cross-sectional view of the sealing member;

FIGURE 2 is a perspective view, partially in section of the sealing member incorporated in a typical joint to be sealed;

FIGURE 3 is a cross-sectional view of the joint of FIGURE 2 with the joint members separated;

FIGURE 4 is a cross-sectional view of the joint of FIGURE 2 with the joint members brought together in sealing relationship; and FIGURE 5 is an enlarged view of an alternative embodiment of the sealing member.

Referring first to FIGURE 1, there is shown a cylindrical sealing element 10 in accordance with the present invention. The sealing element 10 may be made of any suitable strip material whether it be metallic or non-metallic and intended for high or low temperature uses. The sealing element 10 comprises a strip member 12 which is formed into a helical configuration so as to form a cylindrical shaped member. In this embodiment, the strip member 12 is formed into an open helical configuration wherein the seam 14 between the adjacent edges of the strip 12 are not abutting but are in a parallel spaced relationship. To complete the closed cylindrical member 10, an additional strip member 16 is formed into a similar helical configuration and is situated within and concentric to the strip member 12 such that the flat portion of the strip 16 lies adjacent the seam 14 of the outside member to effectively seal the seam. By allowing the seam 14 of the strip member 12 to be open the edges of the strip 12 may move longitudinally with respect to one another to allow for the flexing of the seal member. Also, in view of the fact that the flat portion of the inside member 16 lies parallel to and against the strip 12 an effective seal is accomplished at the seam 14 to provide a substantially continuous cylindrical member which is flexible for use in sealing irregularly shaped joints.

Referring now to FIGURE 2, there is illustrated a typical joint where the sealing means 10 may be employed. Herein are shown two wall members 18 and 20 representing a portion of a confine to enclose a gas or fluid, the inner or higher pressure side of the confine being represented by the larger arrow 19. These wall members are supported for movement with respect to one another thereby making it necessary to seal the joint therebetween when the members are moved in abutting relationship to form a continuous wall of the confine. An example of such an application is the joint between an engine nacelle and the thrust reverser doors on a gas turbine engine assembly.

To seal this joint between the wall members 18 and 20, there is attached to wall member 20, as by welding or riveting, a seal retainer 22 which extends from the member 20 towards the wall member 18. The retainer 22 comprises retainer members 24 and 26 which are positioned in parallel abutting relationship along the wall member 20 with the portions that extend beyond the member 20 shaped to form a three-sided retainer in which is located the sealing member 10 described heretofore.

As illustrated also in FIGURES 3 and 4, the seal retainer is attached to the wall member 20 with the open side 21 facing the enclosure member 18. The seal member 10 is maintained within the seal retainer 22 by a plurality of T-bolts 28 which pass through openings 34 in the side of the seal retainer 24 facing toward the wall member 20. These T-bolts are maintained in position by a fastener or bolt 36 threaded onto a threaded portion of the T-bolt. The heads 32 of these T-bolts extend through openings 30 in the seal member 10; these openings are rectangular and similar in configuration to the shape of the T-bolt heads 32 and should preferably run lengthwise of the strip members 12 and 16 to prevent severing the strip member. After admission into the seal member 10, the T-bolt head 32 may be rotated approximately 90° or by such an amount that if maintained in that position with respect to the seal member, will hold the seal member 10 within the seal retainer 22. In view of the fact that the holes 30 in the seal member 10 are not closed by the T-bolt head 32, the holes also serve to admit gas into the seal member 10 to equalize the pressures inside and outside the member as will be explained later. Also, the T-bolt assembly may in addition be welded or otherwise fastened to the seal retainer member 24 so as to prevent rotation of the T-bolt and prevent its inadvertently becoming disengaged from the seal member 10.

In operation, with the seal member 10 fastened within the seal retainer 22 as described heretofore, as the wall members 18 and 20 are moved adjacent one another to form the joint to be sealed, the abutment member 40 contacts the seal member 10 as illustrated in FIGURE 4. The seal member 10 is pushed back into the seal retainer 22 a slight amount and due to the flexibility of the seal member will seal against the abutment 40 even though this abutment may have a somewhat irregular configuration. To assist in seating the seal member 10 against the abutment 40, however, a plurality of openings 42 are located in the retainer member 24 to allow the high pressure gas 19 inside the confine 22 to reach that side of the seal member 10. In this manner, the pressured gas acts against the seal member 10 as indicated by the small arrows to force the seal member tightly against the abutment member 40 and the retainer member 26. An effective seal is thus provided between the wall members 18 and 20 to substantially prevent fluid flow through the joint formed between the members. Also this gas may pass to the inside of the seal member 10 through the openings 30 to equalize the pressures inside and outside the seal member and prevent the seal member from becoming distorted by any difference in such pressures.

Another embodiment of the sealing member is illustrated in FIGURE 5 where the seal member 46 comprises a single strip member 48 is formed into a closed helical configuration so as to form a continuous cylindrical shaped member. In this embodiment, this strip member 48 is formed with a slight offset portion 50 to accommodate the overlapping of the adjacent edges when formed in this helical configuration.

As in the prior embodiment, openings 52 are provided in that side of the seal facing the seal retainer 54 for the insertion of a plurality of T-bolts 56 to retain the seal member in the retainer 54. A threaded fastener 58 coacts with the threaded end of the T-bolt to hold it in place. A spring member 60 may be utilized between the seal retainer 54 and the seal member 46 to bias the seal member against the coacting wall member.

Where a particular embodiment of the invention has been illustrated and described, it will be obvious to those skilled in the art that various changes and modifications may be made without departing from the invention. For instance, the seal member 10 need not be cylindrical as shown but may assume any desired cross-sectional shape to meet specific applications. Further, the seal enclosure 22 may be of any special configuration to conform with the cross-sectional shape of the seal member 10 and also it will be appreciated that other means of maintaining the seal member 10 within this enclosure may be utilized as well as other spring-like members to position the seal member. It is therefore intended to cover in the appended claims all such changes and other modifications that come within the true spirit and scope of the invention.

What I claim as new and desire to secure by Letters Patent of the United States is:

1. A sealing means for sealing the joint between first and second wall members comprising,
    a seal retainer to be supported from a first wall member,
    said retainer comprising an enclosure extending the length of the joint with an open side facing in the direction of the second wall member,
    a sealing member, said sealing member comprising a plurality of concentric strip members formed in a helical configuration to form a cylindrical sealing member with the adjacent strip members positioned such that the adjacent seams and strip members overlap
    and means for supporting said sealing member for retention and movement within said retainer whereby said sealing member will abut said retainer and a second wall member when said members are brought together to seal the joint therebetween.

2. The sealing means of claim 1 wherein the means for supporting said seal member comprises a plurality of bolt fasteners extending from said retainer and through openings in said sealing member to support and allow limited movement of said sealing member with respect to said retainer.

References Cited in the file of this patent

UNITED STATES PATENTS

| 249,560 | Wagenen | Nov. 15, 1881 |
| 494,972 | Wiegand | Apr. 4, 1893 |
| 1,153,162 | Howe | Sept. 7, 1915 |
| 1,428,976 | Payne | Sept. 12, 1922 |
| 2,092,898 | Tondour | Sept. 14, 1937 |
| 2,686,343 | Harpoothian et al. | Aug. 17, 1954 |
| 2,811,379 | Hemsworth | Oct. 29, 1957 |

FOREIGN PATENTS

| 107,454 | Sweden | June 10, 1942 |
| 690,932 | Great Britain | Apr. 29, 1953 |